BALANCED MODULATOR HAVING SUPPRESSION MEANS

Filed July 14, 1965 3 Sheets-Sheet 1

INVENTOR.
JERRY L. HOLSINGER
BY
Kenyon & Kenyon
ATTORNEYS

BALANCED MODULATOR HAVING SUPPRESSION MEANS

Filed July 14, 1965 3 Sheets-Sheet 2

INVENTOR.
JERRY L. HOLSINGER
BY
Kenyon & Kenyon
ATTORNEYS

INVENTOR.
JERRY L. HOLSINGER
BY
Kenyon & Kenyon
ATTORNEYS 3,384,840

BALANCED MODULATOR HAVING SUPPRESSION MEANS

Jerry L. Holsinger, Bedford, Mass., assignor, by mesne assignments, to Teldata Corporation, Santa Barbara, Calif., a corporation of Delaware Filed July 14, 1965, Ser. No. 471,897
9 Claims. (Cl. 332—44)

This invention relates generally to balanced modulators and more particularly to a new and improved transistorized balanced modulator which produces an amplitude modulated signal having the carrier signal and the amplitude modulating signal suppressed.

In the amplitude modulation of a carrier signal by means of a sinusoidal modulating signal, a resultant signal is produced which has four basic components, viz., a signal at the carrier frequency, a signal at the modulating frequency, a signal at a frequency which is the sum of the carrier and modulating frequencies, i.e., the upper sideband, and a signal at a frequency which is the difference of the carrier and modulating frequencies, i.e., the lower sideband. In many applications it is desirable to suppress the carrier signal and/or the modulating signal. In conventional balanced modulators utilizing tubes and transformers, carrier suppression is accomplished by applying the modulating signal to the tubes in push-pull and the carrier signal in phase. Due to the wide separation between the frequency of the modulating signal and the frequency of the carrier signal, the modulating signal was filtered out by the tuned output circuit. Since, in such modulators, carrier suppression depended upon both tubes in the modulator having the same or nearly the same dynamic characteristics, where, through aging, the dynamic characteristics of the tubes became materially different, it was possible to have a variation in carrier suppression of 10 db or more.

In addition, in applications where the sideband frequencies of the modulated signal were close to or overlapped the modulating signal, conventional tube balanced modulators were incapable of suppressing the entire modulating signal. Although one solution was to apply the carrier signal in push-pull and the modulating signal in phase, again, suppression of the modulating signal varied with aging of the tubes and the carrier signal could not be suppressed. Where the modulated signal is to be transmitted over ordinary voice band telephone circuits, it is very desirable to suppress the modulating signal to prevent distortion.

In copending application Ser. No. 247,186, now Patent No. 3,324,416, granted June 6, 1967, for "Amplitude Modulation System," a transistorized balance modulator is disclosed which overcomes the above mentioned difficulties present in tube balanced modulators. In the transistorized balanced modulator disclosed, a transistor square wave oscillator provides a square wave carrier signal to a diode-resistor network and a special transistor amplifier provides a modulating signal at the proper D.C. level to the same network. Application of the modulating signal and square wave carrier to the diode-resistor network gives an output signal containing the original modulating signal, the carrier frequency and both sidebands. Carrier suppression is accomplished by adding to the output signal a square wave signal at the carrier frequency having the same amplitude thereas but inverted with respect thereto. Suppression of the modulating signal is accomplished by means of a transistor circuit which adds to the output signal, a signal having half the amplitude of the modulating signal but inverted with respect thereto.

Although the transistor balanced modulator disclosed in copending application Ser. No. 247,186, now Patent No. 3,324,416, granted June 6, 1967, has been found to offer decided advantages over conventional tube-transformer balanced modulators, especially in applications where there is a narrow separation between the modulating signal and the carrier signal frequencies, certain disadvantages exist therein. Thus, suppression of the modulating signal varied both with signal level (due to nonlinearities of the modulating signal inverting circuit transistor) and with time and temperature (due to variations in the current gain of the modulating signal inverting circuit transistor). Additionally, carrier suppression varied with proper manual adjustment of a resistive subtraction network and temperature induced variations in a Zener diode voltage reference circuit. Also, due to the use of special circuitry and several Zener diodes, this modulator does not lend itself to use of standard modular components.

Due to the disadvantages of the heretofore known balanced modulators, it is highly desirable to provide a balanced modulator capable of both carrier signal suppression and modulating signal suppression which makes use of transistors and not tubes or transformers and whose suppression capability is independent of changes in the characteristics of the modulator components due to temperature, aging and the like.

It is thus an object of this invention to provide a new and improved balanced modulator that effectively suppresses the modulating signal and/or the carrier signal.

It is another object of this invention to provide a new and improved balanced modulator that uses transistors and no tubes or transformers.

It is yet another object of this invention to provide a new and improved balanced modulator that suppresses the modulating signal where the carrier signal and modulating signal frequencies are narrowly separated.

It is a further object of this invention to provide a new and improved balanced modulator wherein carrier signal suppression and/or modulating signal suppression is independent of changes in the characteristics of the modulator components due to temperature, aging or the like.

It is a still further object of this invention to provide a new and improved balanced modulator wherein the input impedance is high, the output impedance is low and the input and output signals have zero D.C. level.

In general, the balanced modulator of the present invention comprises a modulating signal source for providing a modulating signal whose amplitude varies, a carrier signal source for providing a carrier signal, circuit means, switching means responsive to said carrier signal provided by said carrier signal source for applying said modulating signal to said circuit means at the frequency of said carrier signal so that a modulated output signal is produced whose amplitude is modulated by said modulating signal at said carrier frequency and inverting circuit means connected to said circuit means for producing a signal at said modulating signal frequency having half the amplitude of said modulating signal and inverted with respect thereto, said signal from said inverting circuit means being added to said modulated output signal to suppress said modulating signal.

These objects and aspects of the present invention as well as others will be more readily apparent from the following description and drawings wherein.

Figure 1:
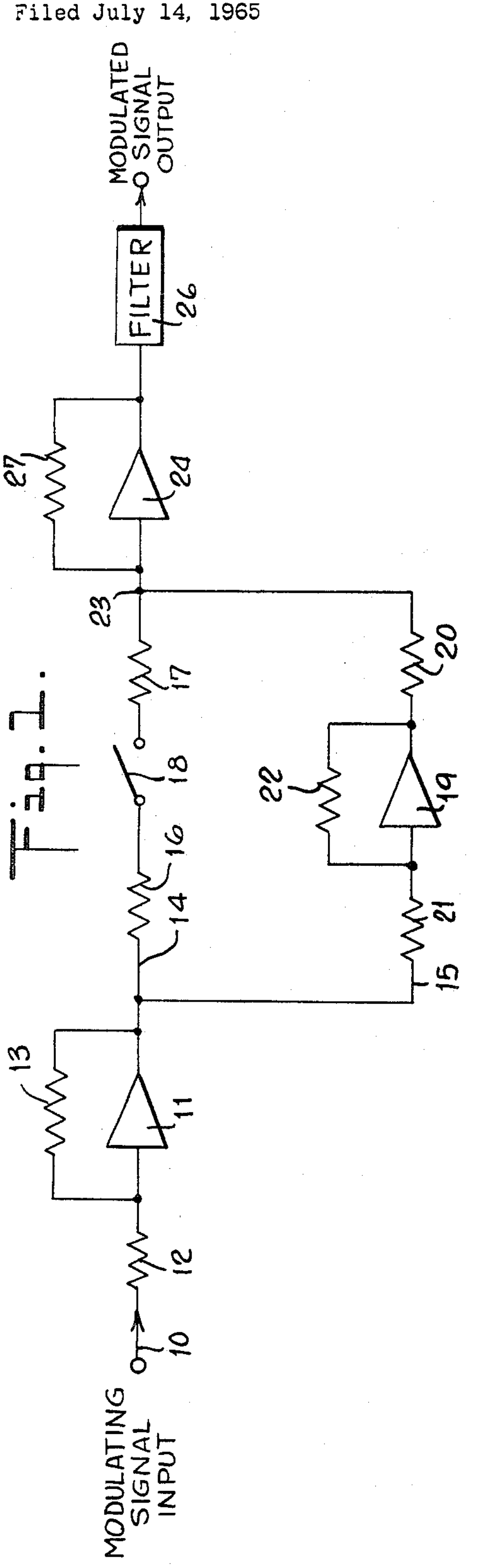
FIGURE 1 is a partially schematic, partially block diagram of a simplified embodiment of the present invention.

Referring now to the figures and more specifically to FIGURE 1, an amplitude varying modulating signal which may, for example, be in the low audio frequency range of 0–2000 cycles per second is fed to modulating signal input 10 of operational amplifier 11 where it is amplified to a desired level. Operational amplifier 11 may be of any well known transistor type having a gain which is essentially independent of signal levels, aging effects and temperature. Such an amplifier will be described hereinafter. Resistors 12 and 13 are provided to establish the gain of the amplifier, the gain being equal to the ratio of the resistance of resistor 13 to the resistance of resistor 12. The amplified and inverted modulating signal is applied to two parallel circuits 14 and 15. Circuit 14 comprises resistors 16 and 17 and switch 18 and circuit 15 comprises operational amplifier 19, resistor 20, and gain determining resistors 21 and 22. Referring now to circuit 14 and assuming circuit 15 is not connected, it is evident that modulating signal current will only flow in circuit 14 when switch 18 is closed. Thus if switch 18 is open, no output signal current will be present at output terminal 23 of circuit 14. If, therefore, switch 18 is caused to open and close at a given periodic frequency, then the signal appearing at output terminal 23 will be the modulating signal pulsed at the switch opening and closing frequency. This modulated output frequency is then amplified by operational amplifier 24 and unwanted components filtered out by filter 26. The gain of amplifier 24 is determined by the resistance of resistor 27 and the sum of the resistances of resistors 16 and 17. Modulating signal suppression is provided by circuit 15 as will be described in greater detail hereinafter with respect to the circuit of FIG. 2.

By providing suitable drive means for causing switch 18 to open and close, it is thus seen that a simple and effective method of producing a modulated carrier signal is obtained. Such drive means could, for example, be a mechanical drive such as a motor-operated cam or the like, or an electronic drive such as a field effect transistor.

Figure 2:
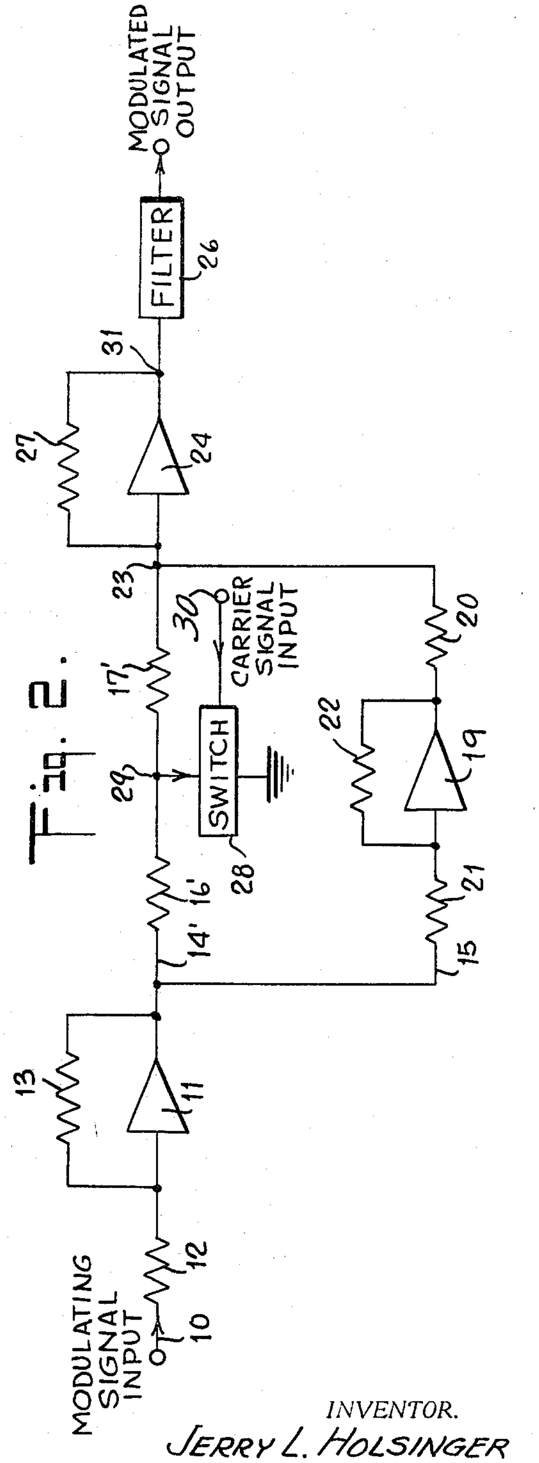
FIGURE 2 is a partially schematic, partially block diagram of a preferred embodiment of the present invention.

Referring now to FIG. 2, there is shown a modification of the modulator shown in FIG. 1. As in FIG. 1, a modulating signal is applied to the input 10 of operational amplifier 11 having gain-determining resistors 12 and 13. The amplified and inverted modulating signal is then applied to parallel circuits 14′ and 15. Again assuming that circuit 15 is not connected to terminal 23, the modulating signal will appear at terminal 23 unchanged since switch 18 has been removed from the circuit and a switch 28, hereinafter to be described, is in the open position. In order to produce a modulated carrier signal, switch 28 is provided, connected to point 29 between resistors 16′ and 17′ to ground.

Switch 28 is caused to open and close by means of a square wave carrier signal applied at input 30. When switch 28 is open, point 29 is disconnected from ground and the modulating signal is allowed to appear at terminal 23. If, however, switch 28 is closed, point 29 will be connected to ground and no modulating signal current will appear at terminal 23. By causing switch 28 to open and close at a given carrier frequency rate, a modulated carrier signal is produced at terminal 23 having an amplitude which varies as the amplitude of the modulating signal varies. This modulated signal is then amplified by amplifier 24 and the voltage at terminal 31 may be written as follows (assuming the carrier signal is a square wave):

$$v_{31}(t)=\frac{R_{27}R_{13}}{(R_{16}'+R_{17}')R_{12}}A_m \sin \omega_m t\left[\frac{1}{2}-\frac{2}{\pi}\sum_{n=1}^{\infty}(-1)^n \cos m\omega_c t\right]$$

where $R_{27}$ is the resistance of resistor 27, $R_{13}$ is the resistance of resistor 13, $R_{16}'$ is the resistance of resistor 16′, $R_{17}'$ is the resistance of resistor 17′ and equals $R_{16}'$, $R_{12}$ is the resistance of resistor 12, $A_m$ is the peak value of the modulating signal, $\omega_m$ is the modulating frequency, $A_m \sin \omega_m t$ is the modulating signal and $\omega_c$ is the carrier frequency.

If the above mathematical expression is expanded and taking only the first term thereof, it will be seen that $v_{31}(t)$ includes as a component:

$$\frac{R_{27}R_{13}}{(R_{16}'+R_{17}')R_{12}}\frac{A_m}{2}\sin \omega_m t$$

which is the modulating signal. It is evident that if a signal were added to $v_{31}(t)$ which is equal in amplitude but inverted with respect to this modulating signal component, the latter would be cancelled out. Connecting circuit 15 to terminal 23 accomplishes this result.

Referring once again to FIGURE 2, circuit 15 comprises inverting operational amplifier 19 with gain determining resistors 21 and 22 and resistor 20. Resistors 21 and 22 may be made equal so that the gain of amplifier 19 is unity and resistor 20 is made twice the value of the sum of the values of resistors 16′ and 17′. It will be understood that the gain of amplifier 19 may be made to have any suitable value by choosing suitable values for resistors 21 and 22. In such a case, the value of resistor 20 is to be chosen so as to produce the proper current amplitude. Thus the modulating signal is inverted by amplifier 19 and given an amplitude by means of resistor 20 and amplifier 19 with resistors 21 and 22 such as to cancel out the modulating signal component appearing at terminal 31. Thus, with circuit 15 connected, the voltage appearing at terminal 31, say $\overline{v}_{31}(t)$ is:

$$\overline{v}_{31}(t)=v_{31}(t)-\frac{R_{27}R_{13}}{R_{12}R_{20}}$$

where $$R_{20}=2(R_{16}'+R_{17}')$$

thus:

$$\overline{v}_{31}(t)=\frac{2}{\pi}\frac{R_{27}R_{13}}{2(R_{16}'+R_{17}')R_{12}}A_m \sin \omega_m t\left[\sum_{n=1}^{\infty}(-1)^n \cos m\omega_c t\right]$$

From this expression it will be seen that not only has the modulating signal been suppressed but also from the nature of the modulator that the carrier signal has been inherently suppressed and that only the sideband signals appear in the modulated output signal.

Filter 26 is provided to remove the undesired harmonics resulting from the square wave carrier.

Figure 3:
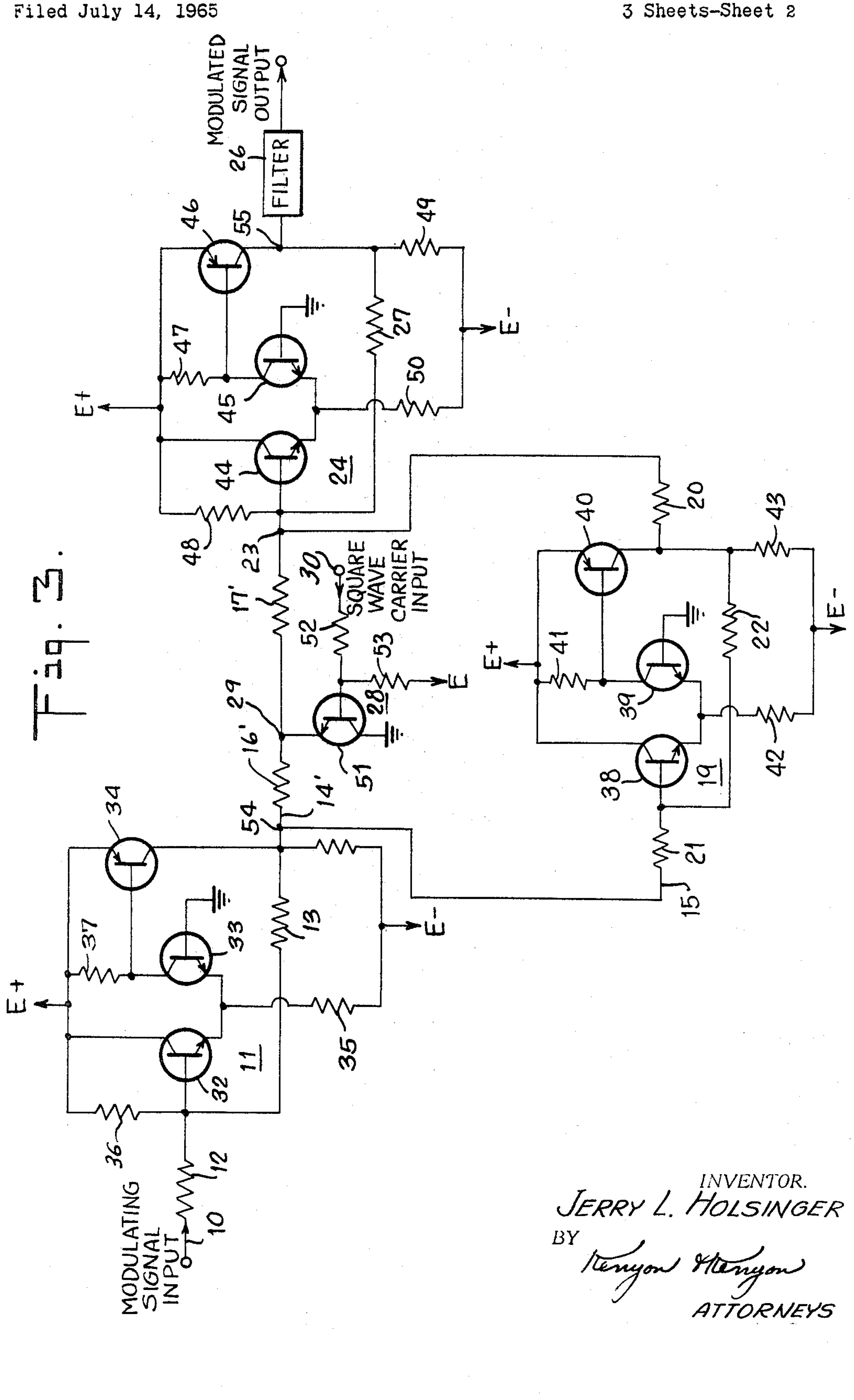
FIGURE 3 is a schematic diagram of the embodiment of FIGURE 2.

Referring now to FIG. 3, there is shown a schematic diagram of the balanced modulator of FIG. 2. As shown, operational amplifier 14 comprises a pair of NPN transistors 32 and 33, and a PNP transistor 34. The emitters of transistors 32 and 33 are coupled together and connected to negative voltage source E− by means of resistor 35. The base of transistor 32 is connected to input resistor 12 and to positive voltage source E+ by resistor 36. The collector of transistor 32 and the emitter of transistor 34 are respectively directly connected to source E+, whereas the collector of transistor 33 is connected to source E+ by resistor 37. The base of transistor 33 is connected to ground, and the base of transistor 34 is directly coupled to the collector of transistor 33, the collector of transistor 34 providing the output to circuits 14′ and 15.

Operational amplifier 19 comprises NPN transistors 38 and 39, PNP transistor 40, and resistors 41, 42 and 43 suitably interconnected and connected to voltage sources E+ and E− in a manner similar to that of amplifier 11.

In similar manner, operational amplifier 24 comprises NPN transistors 44 and 45, PNP transistor 46, and resistors 47, 48, 49 and 50.

NPN transistor 51 is provided to act as an electronic switch. As shown, the collector of transistor 51 is connected to ground, the emitter thereof is connected to point 29 and the base thereof is connected to square wave carrier input 30 by means of resistor 52, and to voltage source E by resistor 53.

The operation of transistor 51 as a switch is as follows: On a negative voltage swing of the carrier signal input, the base of transistor 51 is driven negative and transistor 51 is non-conductive, thus acting as an open circuit. Under such conditions, the modulating signal is allowed to appear at terminal 23. On a positive swing of the carrier signal input, on the other hand, transistor 51 is conductive and acts as a short circuit to ground from point 29. Hence, the modulating signal is prevented from appearing at terminal 23 and an amplitude modulated signal having a carrier frequency of the square wave carrier input signal is produced at terminal 23.

Figure 4:
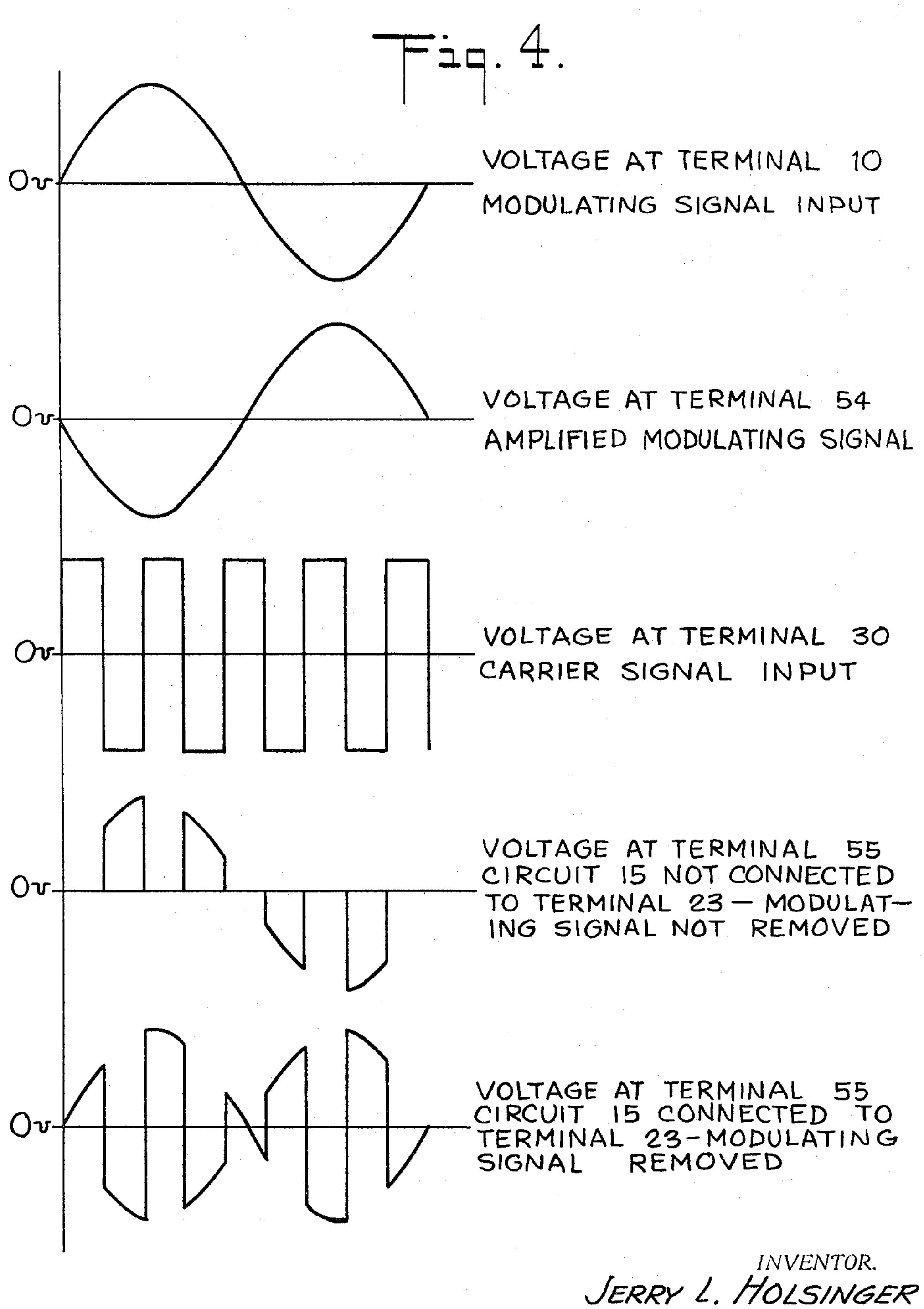
FIGURE 4 is a diagram showing waveforms present in the embodiment of FIGURE 2.

Referring to FIGURE 4 there are shown the waveforms respectively appearing at terminals 10, 54, 30, 55 (circuit 15 not connected to terminal 23) and 55 (circuit connected to terminal 23).

It will be seen that the balance modulator of the present invention will effectively suppress the modulating signal even though the carrier frequency and the modulating frequency are narrowly separated since suppression is not accomplished by use of a tuned circuit, but rather by subtractive techniques. It will also be seen that due to the use of high gain operational amplifiers in all stages, the allowable frequency range of both modulating and carrier signals is greatly increased. Use of operational amplifiers which have gain which is essentially independent of signal levels, aging effects and temperature also provides uniform suppression of the modulating signal.

From the above description and drawings, it is further seen that the balanced modulator of the present invention is relatively inexpensive to build due to the potential use of modulator components and microcircuit techniques. The modulator of this invention has a high input impedance, as well as a low output impedance and all signals, input and output, have zero D.C. level.

Although specific embodiments of this invention have been described hereinabove and shown in the drawings, it will be appreciated that other embodiments and modifications known to those skilled in the art are contemplated to be within the scope of the present invention. Thus although specific embodiments have been described and shown for the various components of balanced modulator of the present invention, other equivalent components well known to those skilled in the art may be substituted therefor and still be within the present invention. The scope of this invention should not be limited by such specific embodiments, but rather by the following claims.

What is claimed is:

1. A balanced modulator comprising modulating signal source means for providing a modulating signal having a varying amplitude, carrier signal source means for providing a carrier signal, switching means connected to said modulating signal source means and said carrier signal source means and output circuit means connected to said modulating signal source means and said switching means for producing a modulated output signal having an amplitude that varies in response to the amplitude of said modulating signal and being pulsed at the frequency of said carrier signal and wherein said output circuit means includes an operational amplifier for amplifying said modulated output signal.

2. The balanced modulator of claim 1 wherein said operational amplifier is transistorized.

3. The balanced modulator of claim 2 including modulating signal suppression means connected between said modulating signal source means and said output circuit means, said suppression means comprising means for inverting said modulating signal and means for dividing the amplitude of said modulating signal in half.

4. The balanced modulator of claim 3 wherein said inverting means is an operational amplifier having a gain of unity and said dividing means is a resistor.

5. The balanced modulator of claim 4 wherein said operational amplifier is transistorized.

6. A balanced modulator comprising a modulating signal source for providing a modulating signal having a variable amplitude, a first operational amplifier for amplifying said modulating signal provided by said modulating signal source, a second operational amplifier, circuit means connecting said first amplifier with said second amplifier, and a switch connected to said circuit means, a carrier signal source for providing a carrier signal, said carrier signal source being connected to said circuit means, said carrier signal causing said switch to alternately short circuit and open circuit said circuit means at said carrier frequency so as to alternately allow said modulating signal to be fed to said second amplifier, such that a modulated output signal is produced by said second amplifier having an amplitude that varies according to the amplitude of said modulating signal and being pulsed at the frequency of said carrier.

7. The balanced modulator of claim 6 including a modulating signal suppression circuit, said suppression circuit including a third operational amplifier connected to said second amplifier for inverting said modulating signal and resistor means for dividing in half the amplitude of said modulating signal, said inverted modulating signal being connected to the input of said second amplifier means such that said inverted modulating signal cancels out said modulating signal.

8. The balanced modulator of claim 7 wherein said first, second and third amplifiers are transistorized and said switch is a transistor which is made alternately conductive or non-conductive by said carrier signal such as to alternately short circuit or open circuit said circuit means.

9. The balanced modulator of claim 8 wherein said carrier signal is a square wave and including filter means connected to the output of said second amplifier for filtering out undesired harmonics resulting from said square wave carrier.

References Cited

UNITED STATES PATENTS

| | | | |
|---|---|---|---|
| 2,812,495 | 11/1957 | Misek | 332—44 X |
| 3,225,303 | 12/1965 | Hauber | 332—9 X |
| 3,324,416 | 6/1967 | Hoag et al. | 332—44 |

ALFRED L. BRODY, *Primary Examiner.*